United States Patent
Huseinovic (10) Patent No.: US 12,392,909 B2
(45) Date of Patent: Aug. 19, 2025

(54) METHOD FOR CONTROL ASSISTANCE OF A VEHICLE

(71) Applicant: Robert Bosch GmbH, Stuttgart (DE)

(72) Inventor: Tarik Huseinovic, Heilbronn (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

(21) Appl. No.: 17/864,580

(22) Filed: Jul. 14, 2022

(65) Prior Publication Data
US 2023/0036653 A1 Feb. 2, 2023

(30) Foreign Application Priority Data
Jul. 22, 2021 (DE) ...................... 10 2021 207 830.3

(51) Int. Cl.
*G01S 19/45* (2010.01)
*G01S 19/23* (2010.01)

(52) U.S. Cl.
CPC .............. *G01S 19/45* (2013.01); *G01S 19/23* (2013.01)

(58) Field of Classification Search
CPC ................................. G01S 19/45; G01S 19/23
See application file for complete search history.

(56) References Cited

U.S. PATENT DOCUMENTS

| | | | |
|---|---|---|---|
| 8,073,963 B1 * | 12/2011 | Wechsler | G06V 10/764 709/231 |
| 2017/0052260 A1 * | 2/2017 | Ramamurthy | G01S 19/24 |
| 2019/0053189 A1 * | 2/2019 | Ramamurthy | H04B 17/27 |
| 2020/0111011 A1 * | 4/2020 | Viswanathan | G06N 20/10 |
| 2020/0210960 A1 * | 7/2020 | Soryal | G06Q 10/1097 |

OTHER PUBLICATIONS

Unsupervised Learning with Weighted K-means by Mallika Dey available at https://medium.com/@dey.mallika/unsupervised-learning-with-weighted-k-means-3828b708d75d as of Jun. 23, 2019 (Year: 2019).*

* cited by examiner

*Primary Examiner* — Anil K Bhargava
(74) *Attorney, Agent, or Firm* — NORTON ROSE FULBRIGHT US LLP (57) ABSTRACT

A method for control assistance of a vehicle. The method includes: receiving GNSS signals from at least one navigation satellite; ascertaining quality parameters of the GNSS signals, the quality parameters describing a reception quality of the received GNSS signals; and ascertaining a driving state of the vehicle based on the quality parameters of the GNSS signals by comparing values of the quality parameters of the received GNSS signals to previously known reference value clusters, the reference value clusters including a plurality of reference values for the particular quality parameters of the GNSS signals, each reference value cluster representing a previously known driving state, and each previously known driving state describing a state of the vehicle influencing a signal transmission of the GNSS signals; and providing a control assistance function based on the ascertained driving state.

12 Claims, 3 Drawing Sheets

METHOD FOR CONTROL ASSISTANCE OF A VEHICLE

FIELD

The present invention relates to a method for control assistance of a vehicle.

BACKGROUND INFORMATION

Signals of the global navigation satellite system may be used for high-accuracy vehicle locating. Relative systems, for example, wheel speed sensors or inertial measuring units, are usually fused with this global system to further improve the position estimation. The GNSS signals and their reception may be negatively influenced by various environmental factors. If untreated, these may result in poor position estimations of the vehicle. Many factors influencing the signal quality are well understood and are compensated for by suitable models, for example, ionosphere and troposphere models and by correction data, so that the position accuracy may be precisely estimated down to a few decimeters. In the case of locating assisted by the global navigation satellite system GNSS, the actual challenge is to compensate for unpredictable interfering influences on the GNSS signals or at least detect them reliably. Due to the large amount of data and variety of received GNSS input signals and relative sensor signals, a reliable statement about the quality of the position resolution is very challenging.

It is therefore an object of the present invention to provide an improved method for control assistance of a vehicle.

SUMMARY

This object may achieved by the method for control assistance of a vehicle according to the present invention. Advantageous embodiments of the present invention are disclosed herein.

According to one aspect of the present invention, a method for control assistance of a vehicle is provided. According to an example embodiment of the present invention, the method includes:
  receiving GNSS signals from at least one navigation satellite of a global navigation satellite system;
  ascertaining quality parameters of the GNSS signals, the quality parameters describing a reception quality of the received GNSS signals; and
  ascertaining a driving state of the vehicle based on the quality parameters of the GNSS signals by comparing the quality parameters to previously known reference value clusters, the reference value clusters including a plurality of reference values for the particular quality parameters of the GNSS signals, each reference value cluster representing a previously known driving state, and each previously known driving state describing a state of the vehicle influencing a signal transmission of the GNSS signals; and
  providing a control assistance function based on the ascertained driving state.

A technical advantage may be achieved in this way that an improved method for control assistance of a vehicle may be provided. By considering the quality parameters of the received GNSS signals, by comparing the corresponding values of the quality parameters of the received GNSS signals to reference values of the particular quality parameters, a driving state in which the particular vehicle is situated at the time of the reception of the GNSS signals may be ascertained. Based on the driving state ascertained in this way, a control assistance function may thereupon be provided which takes into consideration the particular driving state. By comparing the current values of the quality parameters of the GNSS signals to the previously determined and previously known reference values, a technically simple and precise identification of the particular driving state may be achieved.

According to one specific example embodiment of the present invention, ascertaining the driving state includes:
  ascertaining a distance of the quality parameters of the received GNSS signals from the reference values of the plurality of reference value clusters in an at least one-dimensional parameter space spanned by the plurality of quality parameters according to a distance measure; and identifying the driving state represented by the reference value cluster having the smallest distance from the quality parameters of the received GNSS signals as the driving state of the vehicle.

A technical advantage may be achieved in this way that a precise determination of the vehicle state, which is simple to carry out, is enabled based on the current values of the quality parameters of the GNSS signals. The driving state of the vehicle is identified here by the driving state which is represented by the reference value cluster having the smallest distance from the particular current values of the quality parameters of the received GNSS signals within the one-dimensional or multidimensional parameter space. The distance determination is simple to implement in this case and only requires little computing time. Rapid determination of the driving state which is economical in computing capacity may be achieved in this way during the active driving of the vehicle.

According to one specific example embodiment of the present invention, the distance measure is a Euclidean distance.

A technical advantage may be achieved in this way that a distance measure which is simple to determine may be provided.

According to one specific example embodiment of the present invention, the reference values of the reference value clusters are based on quality parameters of reference GNSS signals received during reference measurements, the reference measurements having been carried out for various driving states of a vehicle.

A technical advantage may be achieved in this way that a precise association of the reference values of the individual reference value clusters with the particular previously known driving states is enabled. The reference values are based in this case on corresponding reference measurements, in which GNSS signals are recorded for previously known driving states and corresponding reference values of the quality parameters are recorded. For this purpose, for example, corresponding test drives of a comparable vehicle may be carried out and the GNSS signals required for determining the reference values may be recorded. The test data may be produced in each case for previously known driving states of the particular vehicle carrying out the test drive.

According to one specific example embodiment of the present invention, each reference value cluster is based on a plurality of quality parameters of a plurality of GNSS signals of various navigation satellites.

A technical advantage may be achieved in this way that a plurality of quality parameters may be taken into consideration. A precise determination of the particular driving state may be achieved by the various quality parameters. Furthermore, GNSS signals of a plurality of navigation satellites may be used. An actual navigation process of the vehicle may be simulated in this way, in which GNSS signals of a plurality of different navigation signals are received and taken into consideration in the navigation.

According to one specific example embodiment of the present invention, each reference value of a reference value cluster is given by a weighted mean value of quality parameters of the plurality of GNSS signals of the plurality of navigation satellites.

A technical advantage may be achieved in this way that precise reference values may be provided, in which GNSS signals of a plurality of navigation satellites may be taken into consideration.

According to one specific example embodiment of the present invention, an association of the determined reference value clusters with the particular driving states is effectuated by a correspondingly trained artificial intelligence.

A technical advantage may be achieved in this way that a precise determination or association of the reference value clusters with the particular driving states of the vehicle is enabled. For this purpose, the artificial intelligence may be trained to associate the plurality of reference values, which were recorded during the reference measurement, of the corresponding received GNSS signals, for example, by carrying out a pattern recognition, with corresponding driving states, in which the reference measurements were carried out. The artificial intelligence may be trained, for example, to characterize the particular previously known driving states by way of the reference values of the quality parameters on the basis of recognized similarities or patterns.

According to one specific example embodiment of the present invention, the association of the determined reference value clusters with the particular driving states of the vehicle is effectuated by executing at least one k-means algorithm, the at least one k-means algorithm being configured to combine the plurality of reference values into reference value clusters and to associate at least one reference value cluster with each previously known driving state, so that the particular driving state is represented by the particular reference value cluster.

A technical advantage may be achieved in this way that the most precise and efficient possible association of the reference values of the reference value clusters with the particular driving states of the vehicle is enabled. By executing the at least one k-means algorithm, which is capable of associating the plurality of reference values of the quality parameters of the received GNSS signals recorded during the reference measurements for the various driving states on the basis of recognized similarities or patterns with the particular driving states, a precise representation of the particular driving states by the corresponding reference value clusters may be achieved. Furthermore, the k-means algorithm is to be executed with only little computing power.

According to one specific example embodiment of the present invention, the association of the reference value clusters is effectuated by executing a plurality of k-means algorithms, each k-means algorithm being executed as a 1-means algorithm and being configured to combine the corresponding reference values to form a reference value cluster for precisely one of the plurality of previously known driving states and associate it with the particular predetermined driving state, and a separate 1-means algorithm being executed for each predetermined driving state for which reference values were determined by corresponding reference measurements.

A technical advantage may be achieved in this way that a precise and efficient association of the reference values of the quality parameters of the received GNSS signals recorded during the reference measurements with various reference value clusters is enabled, the various reference value clusters each representing at least one driving state of the vehicle, in which the particular reference values were recorded during the reference measurements. By executing the k-means algorithm as a 1-means algorithm, an individual 1-means algorithm being executed for each driving state to be determined, the association of the individual reference values with the particular reference value clusters may be further simplified. The reference value recorded for a driving state in the corresponding test measurements may be combined in a corresponding reference value cluster by the 1-means algorithm. In that a separate 1-means algorithm is used for each driving state taken into consideration using corresponding reference measurements, corresponding reference value clusters may be formed for a plurality of different driving states. In that a 1-means algorithm is used instead of a k-means algorithm for each driving state, it may be ensured that the reference value cluster which best depicts the reference values is found for the particular driving state. The complexity of the method may be reduced in this way and, in conjunction with this, a required computing capacity may be decreased.

According to one specific example embodiment of the present invention, a driving state includes at least one state from the following list:
- a GNSS antenna of the vehicle is damaged; and/or the GNSS antenna is coated by ice, snow, dust, dirt, moisture; and/or
- the GNSS antenna is at least partially concealed by a luggage roof rack and/or roof luggage and/or a roof structure of the vehicle; and/or
- the vehicle is located before or after a tunnel, under a bridge, under a tollbooth display; and/or
- the vehicle is located adjacent to a truck, adjacent to a building façade, the vehicle is surrounded by trees; and/or the vehicle is located in city traffic or intercity traffic.

A technical advantage may be achieved in this way that a variety of different driving states which occur during the driving of a vehicle and may impair the signal quality of the received GNSS signals may be taken into consideration.

According to one specific example embodiment of the present invention, the quality parameters of the GNSS signals include at least one parameter from the following list: signal strength, signal quality, signal frequency, number of the received satellites, signal phase.

A technical advantage may be achieved in this way that a plurality of different quality parameters of the received GNSS signals, which are provided, for example, by a measurement engine of a vehicle motion positioning sensor (VMPS), may be taken into consideration. A precision of the determination of the particular driving state may be increased by a preferably large plurality of different quality parameters.

According to one specific example embodiment of the present invention, the control assistance function includes at least one function from the following list:
- determining a signal integrity of the received GNSS signals based on the ascertained driving state and providing the determined signal integrity to a navigation module of a vehicle controller;

prompting a correction of a position determination by the navigation module based on the received GNSS signals and the ascertained integrity statement; and/or displaying the driving state of the vehicle to a driver of the vehicle; and/or providing the driving state of the vehicle to a vehicle controller of the vehicle; and/or generating an integrity statement with respect to the received GNSS signals based on the driving state and providing the integrity statement to the vehicle controller.

A technical advantage may be achieved in this way that an efficient control assistance may be provided. For example, based on the determined driving state, a signal integrity of the received GNSS signals may be determined. The corresponding signal integrity may furthermore be taken into consideration in the navigation of the vehicle based on the received GNSS signals, in that GNSS signals having lower integrity are taken into consideration with lower prioritization. For example, corrections of the positioning based on the received GNSS signals may be carried out based on the determined signal integrity. Alternatively or additionally, the correspondingly determined driving state may be provided as additional information to both the vehicle controller and also the driver of the vehicle. The additional information of the driving state may thus be incorporated into the control of the vehicle.

According to a second aspect of the present invention, a processing unit is provided which is configured to carry out the method for control assistance of a vehicle according to one of the above-mentioned specific example embodiments.

According to a third aspect of the present invention, a computer program product including commands is provided which, upon the execution of the program by a data processing unit, prompt it to carry out the method for control assistance of a vehicle according to one of the above-mentioned specific example embodiments.

Exemplary embodiments of the present invention are explained on the basis of the figures.

DETAILED DESCRIPTION OF EXAMPLE EMBODIMENTS

Figure 1:
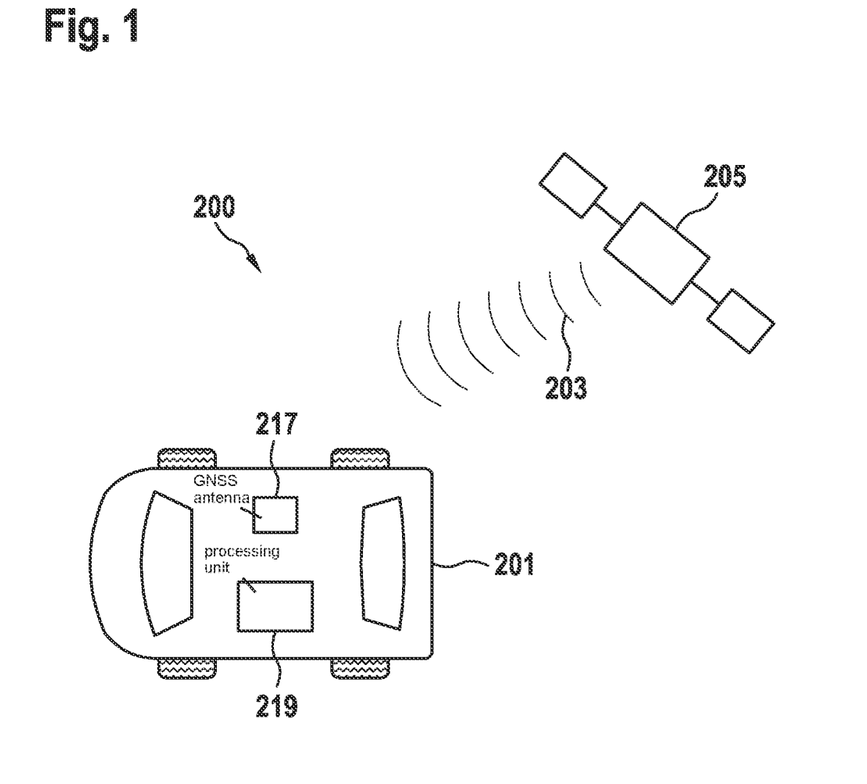
FIG. 1 shows a schematic representation of a system for control assistance of a vehicle according to one specific embodiment.

FIG. 1 shows a schematic representation of a system 200 for control assistance of a vehicle 201 according to one specific embodiment.

In the specific embodiment shown, vehicle 201 includes at least one GNSS antenna 217, which is configured to receive GNSS signals 203 of at least one navigation satellite 205 of a global navigation satellite system. Furthermore, vehicle 201 includes a processing unit 219, which is configured to carry out the method according to the present invention for navigation assistance of a vehicle 201.

For the control assistance according to the present invention, vehicle 201 receives GNSS signals 203 of at least one navigation satellite 205 via GNSS antenna 217. Quality parameters 206, 207, 208, which are provided, for example, by a measurement engine of the vehicle motion positioning sensor (VMPS) of vehicle 201, are thereupon determined for received GNSS signals 203. Quality parameters 206, 207, 208 may include, for example, a signal quality, a signal-to-noise ratio, a signal frequency or further parameters describing the signal quality of the received signals. A driving state 209 of vehicle 201 is ascertained thereafter based on ascertained quality parameters 206, 207, 208 and in particular based on particular values 211 of quality parameters 206, 207, 208 of received GNSS signals 203. For this purpose, values 211 of quality parameters 206, 207, 208 of received GNSS signals 203 are compared to corresponding reference values of stored, previously known reference value clusters 213, 214, each reference value cluster 213, 214 representing an individual driving state 209. Values 211 of quality parameters 206, 207, 208 may in particular be represented as a combination of the plurality of quality parameters 206, 207, 208, that is to say as a centroid or center point of quality parameters 206, 207, 208 in the parameter space.

Reference value clusters 213, 214 may each include a plurality of reference values of quality parameters 206, 207, 208 in this case. The reference values may be generated for this purpose by corresponding reference measurements, which were carried out for predetermined driving states of vehicle 201 and during which corresponding GNSS signals 203 having corresponding quality parameters 206, 207, 208 were received. Corresponding reference value clusters 213, 214 may be generated for this purpose by executing a correspondingly trained artificial intelligence or by executing at least one k-means algorithm. For this purpose, the reference values of quality parameters 206, 207, 208 recorded by the reference measurements may be combined based on corresponding similarities or patterns of the plurality of reference values to form corresponding reference value clusters 213, 214. This may be carried out for this purpose in such a way that each reference value cluster 213, 214 represents an individual driving state 209 of vehicle 201. A reference value cluster 213, 214 represents in this case a driving state 209 when the corresponding reference values of quality parameters 206, 207 of particular reference value cluster 213, 214 were recorded or were received at times at which the particular vehicle was operated in corresponding driving state 209. This may be achieved or supported, for example, in that corresponding test drives were carried out to generate the reference measurements in predetermined driving states of the particular vehicle used for the test drive and therefore the particular reference values of the quality parameters of the GNSS signals recorded during the reference measurements have shared properties which distinguish them from reference values which were recorded during another reference measurement and a correspondingly different driving state 209 of the vehicle.

Driving states 209 ascertained in this way may be provided, for example, in that GNSS antenna 217 is coated by ice, snow, moisture, dust, or dirt. Alternatively, driving states 209 may be provided in that the vehicle is located before/after a tunnel or under a bridge or a toll registration system at the time of the recording of the GNSS signals. Alternatively, driving state 209 may be characterized in that the vehicle is operated in city traffic including a plurality of multistory buildings or in intercity traffic including wide-ranging open areas adjacent to the roadway. Particular driving states 209 are characterized in this case in that they influence the signal quality of received GNSS signals 203 in a characteristic way. The corresponding values of the quality parameters of the received GNSS signals differ in this case in a characteristic way from values of quality parameters of GNSS signals which are received while the vehicle is in another driving state 209. Therefore, by taking into consideration the values of quality parameters 206, 207, 208, conclusions may be drawn about particular driving state 209 in which the vehicle was situated at the time of the reception of particular GNSS signals 203.

By executing the corresponding algorithms, the reference values of quality parameters 206, 207, 208 determined during the reference measurements may be combined to form corresponding reference value clusters 213, 214, which each represent an individual driving state 209.

Correspondingly determined reference value clusters 213, 214 or the association linked thereto with particular driving states 209 may be stored, for example, in a corresponding database, so that during the navigation of vehicle 201 during the current driving of the vehicle, predetermined reference value clusters 213, 214 and the associations linked thereto may be used to carry out the method according to the present invention for control assistance.

To determine the current driving state in which vehicle 201 is situated during the active control of vehicle 201, currently recorded values 211 of quality parameters 206, 207, 208 of GNSS signals 203 received during the navigation of vehicle 201 are compared to the particular reference values of previously known and stored reference value clusters 213, 214. For this purpose, a distance determination of current values 211 of quality parameters 206, 207, 208 from reference value clusters 213, 214 within a parameter space 215 spanned by the plurality of quality parameters 206, 207, 208 may be ascertained. Current values 211 of quality parameters 206, 207, 208 of GNSS signals 203 recorded during the navigation are associated in this case with reference value cluster 213, 214 having the smallest distance to particular current values 211. Driving state 209 represented by particular reference value cluster 213, 214 is identified here as the current driving state of vehicle 201. Reference is made to the description of FIG. 2 for a detailed description of the distance determination or association of values 211 of quality parameters 206, 207, 208 of recorded GNSS signals 203 with particular reference value clusters 213, 214.

Furthermore, a control assistance function is provided based on driving state 209 ascertained in this way. The control assistance function may provide, for example, determining a signal integrity of received GNSS signals 203 based on ascertained driving state 209 and providing this signal integrity to a navigation module, for example, the vehicle motion positioning sensor (VMPS). Furthermore, a correction of the position determination by the navigation module may be prompted based on ascertained driving state 209. Alternatively or additionally, ascertained driving state 209 may be provided as independent information to both the vehicle controller of the vehicle and also the driver of the vehicle, so that driving state 209 ascertained in this way may be taken into consideration in the control of the vehicle.

Figure 2:
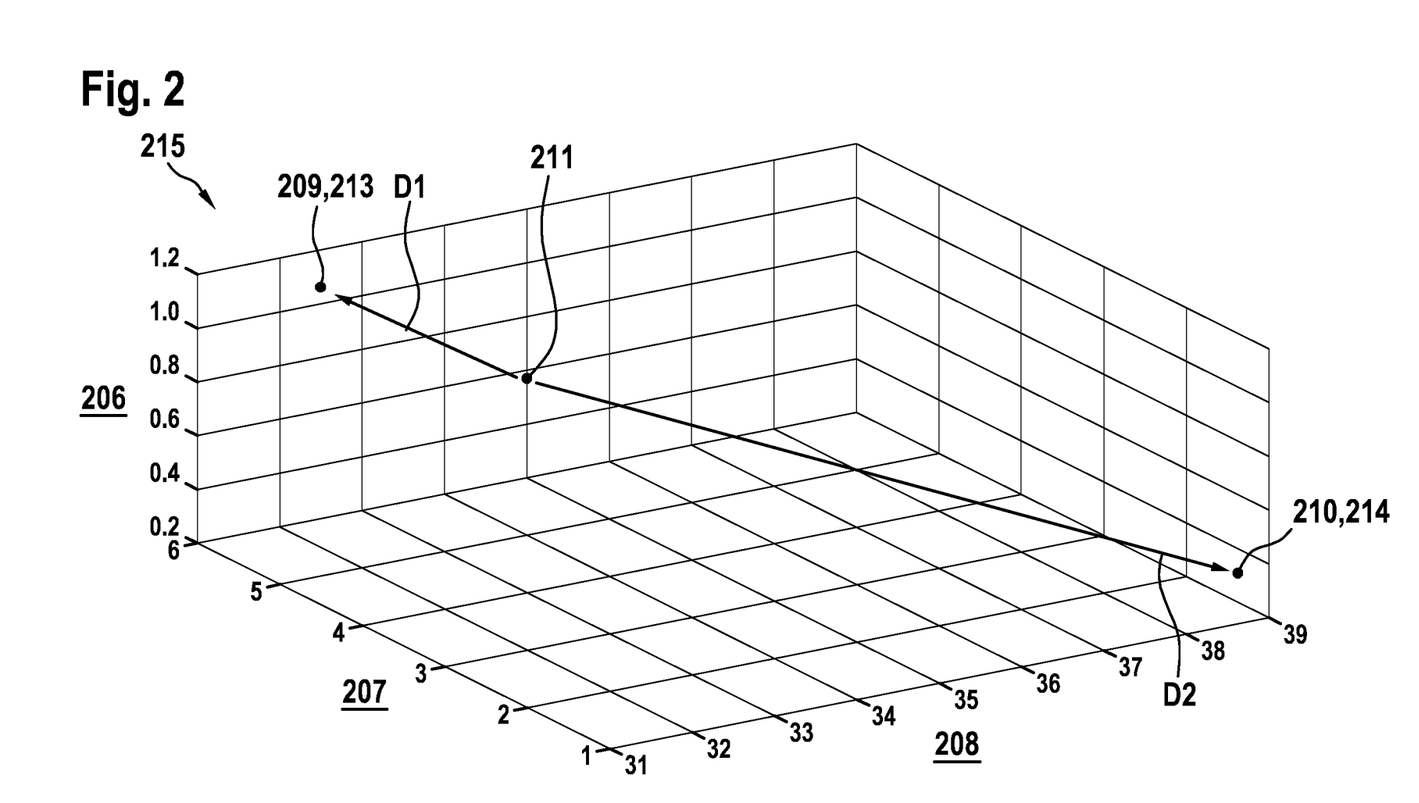
FIG. 2 shows a schematic representation of a parameter space spanned by quality parameters of GNSS signals.

FIG. 2 shows a schematic representation of a parameter space 215 spanned by quality parameters 206, 207, 208 of GNSS signals 203.

In the specific embodiment shown, parameter space 215 is spanned by three different quality parameters 206, 207, 208. These may be provided, for example, by a signal strength, a signal-to-noise ratio, and a signal frequency of received GNSS signals 203.

Furthermore, two different reference clusters 213, 214 are accommodated in parameter space 215, which each represent one individual driving state 209, 210. The two different driving states 209, 210 may be provided, for example, in that, on the one hand, GNSS antenna 217 of vehicle 201 is at least partially concealed, for example, by a luggage roof rack installed on vehicle 201 and, on the other hand, the vehicle is located underneath a bridge. To generate reference value clusters 213, 214, corresponding reference measurements may have been carried out for this purpose, for example, for different driving states 209, 210, for example, by corresponding test drives of a vehicle. The reference values determined in this way of quality parameters 206, 207, 208 of GNSS signals 203 received during the reference measurements may have been generated for this purpose either by a correspondingly trained artificial intelligence or by execution of correspondingly designed k-means algorithms, in that the corresponding reference values of the quality parameters are combined by the artificial intelligence or the k-means algorithm on the basis of the particular properties which they include due to particular driving state 209, 210 to form reference value clusters 213, 214.

Furthermore, a current value 211 of quality parameters 206, 207, 208 is shown in FIG. 2, which was recorded during a navigation process of currently activated vehicle 201. To determine particular driving state 209, in which vehicle 201 was located at the time of the recording of particular GNSS signals 203, the respective current values 211 are compared with previously known and stored reference value clusters 213, 214 by a distance determination of values 211 from particular reference value clusters 213, 214 within parameter space 215. Based on the distance determination, current values 211 are associated with reference value cluster 213, 214 which has the smallest distance to particular values 211. In FIG. 2, values 211 are therefore associated with reference value cluster 213, since this has a lesser distance at distance D1 than reference value cluster 214, which has a distance D2 from current values 211. Current driving state 209 of vehicle 201 is identified by driving state 209, 210 which is represented by particular reference value cluster 213, 214 with which values 211 of particular quality parameters 206, 207, 208 were associated. In the specific embodiment shown, driving state 209 of reference value cluster 213 is therefore identified as the current driving state of vehicle 201.

The distance determination of current values 211 from a reference value cluster 213, 214 may be implemented by a determination of the distance of current values 211 from a center of particular reference value cluster 213, 214 within the parameter space.

Figure 3:
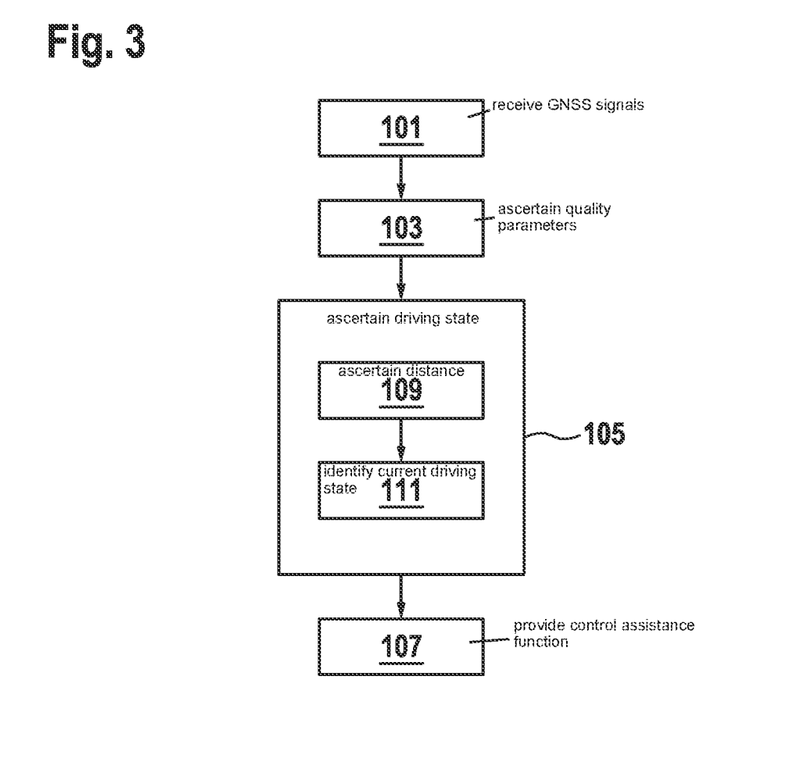
FIG. 3 shows a flowchart of a method for control assistance of a vehicle according to one specific embodiment of the present invention.

FIG. 3 shows a flowchart of a method 100 for control assistance of a vehicle 201 according to one specific embodiment.

Method 100 according to the present invention for control assistance of a vehicle 201 may be carried out by a system 200 according to the specific embodiment in FIG. 1.

For this purpose, in a method step 101, GNSS signals are received from at least one navigation satellite 205.

In a further method step 103, quality parameters 206, 207, 208 of received GNSS signals 203 are ascertained.

In a further method step 105, a driving state 209, 210 of vehicle 201 is ascertained based on quality parameters 206, 207, 208 of received GNSS signals 203 by comparing values 211 of quality parameters 206, 207, 208 of received GNSS signals 203 to previously known reference value clusters 213, 214, reference value clusters 213, 214 including a plurality of reference values for particular quality parameters 206, 207, 208 of GNSS signals 203, and a previously known driving state 209, 210 being represented by each reference value cluster 213, 214.

For this purpose, in a method step 109, a distance D1, D2 of current values 211 of quality parameters 206, 207, 208 of received GNSS signals 203 from the reference values of the plurality of reference value clusters 213, 214 in an at least one-dimensional parameter space 215 spanned by the plurality of quality parameters 206, 207, 208 is ascertained according to a distance measure. The ascertainment of the distances of current values 211 from reference value clusters 213, 214 may be carried out according to the explanations in FIG. 2.

In a method step 111, current driving state 209, 210 of vehicle 201 is identified as driving state 209, 210 which is represented by reference value cluster 213, 214, which has smallest distance D1, D2 from current values 211 of quality parameters 206, 207, 208 of GNSS signals 203 received during the navigation process of vehicle 201.

In a further method step 107, a control assistance function is provided based on ascertained driving state 209, 210. The control assistance function may include, for example, providing a signal integrity of received GNSS signals 203.

According to the present invention, at least one so-called k-means algorithm may be executed for the determination of reference value clusters 213, 214. The k-means algorithm is used for the cluster analysis of measured values or data points and is configured to identify similarities and/or patterns in the data points and to organize the data points into clusters of data points based on the patterns or similarities, the data points of one cluster being more similar to one another with respect to the patterns or similarities than two data points of other clusters. In its basic form, the k-means algorithm provides an algorithm for unsupervised learning. The goal of the algorithm in this case is to minimize a quality function in the following form:

$$F = \sum_{i=1}^{k} \sum_{x \in M_{c\_i}} dist(c_i, x)^2 \quad \text{(eq. 1)}$$

In this case, dist denotes a distance function, $c_i$ denotes a center of an ith cluster, x denotes a recorded data point, and k denotes the number of the clusters. Distance function dist may in this case, for example, describe the Euclidean distance between recorded data point x to be classified from an M-dimensional space and the center of the ith cluster ($c_i$) (also called "centroid"). Number of clusters k is generally a freely selectable parameter.

According to the present invention, the k-means algorithm is repurposed as an algorithm for quasi-supervised learning. For this purpose, for k=1, a 1-means algorithm is used for each cluster to be determined. To generate reference value clusters 213, 214, individual measurements are therefore carried out for each driving state 209, 210 and corresponding GNSS signals 203 are received. Particular quality parameters 206, 207, 208 of the GNSS signals received for the reference measurements are each associated by a correspondingly trained 1-means algorithm with particular reference value cluster 213, 214 by minimizing the distance function. Corresponding reference measurements are carried out for the various previously known driving states and individual 1-means algorithms are executed to generate reference value clusters 213, 214.

A special use case is, for example, a test drive including installed roof structures, a further one would be city drives or also drives including ice-covered GNSS antenna. Since the 1-means algorithm only calculates one reference value cluster per model, the N reference value clusters represent precisely the cluster points which characterize particular driving state 209, 210 with greatest precision.

Therefore, a plurality of different reference value clusters 213, 214 for various driving states may be generated by the training phase, which mathematically describe the different scenarios/surroundings conditions of driving states 209, 210. Each reference value cluster 213, 214 includes a plurality of quality parameters 206, 207, 208 of GNSS signals 203 received in the reference measurements. Quality parameters 206, 207, 208 may include, for example, a signal quality, a signal-to-noise ratio, a signal strength, a signal frequency, or other quality-relevant information. GNSS signals 203 received in the reference measurements may include signals from a plurality of different navigation satellites 205. Quality parameters 206, 207, 208 of reference value clusters 213, 214 may be formed as the weighted mean values of quality parameters 206, 207, 208 of the plurality of GNSS signals 203 of the plurality of different navigation satellites 205.

The determination of reference value clusters 213, 214 may be carried out in an offline state, that is to say before the corresponding algorithm is installed in the particular vehicle.

If cluster points or reference value clusters 213, 214 are known, to determine driving state 209, 210 in an online state of vehicle 201, that is to say during an active control of vehicle 201, an online-capable assignment of values 211 of quality values 206, 207, 208, which were recorded in the course of the navigation, of GNSS signals 203 received by vehicle 201 to already existing reference value clusters 213, 214 may be carried out.

For each navigation period in which GNSS signals 203 are received, distance D1, D2 of current values 211 from already known reference value clusters 213, 214 is calculated. Distance function dist may, as already mentioned, describe the Euclidean distance in the multidimensional parameter space. The association of current values 211 of quality parameters 206, 207, 208 with known reference value clusters 213, 214 may be mathematically described as:

$$D = \min\left\{\sum_{j=1}^{N} dist(c_j, x)^2\right\} \quad \text{(eq. 2)}$$

In this case, D corresponds to particular distances D1 or D2 to be determined, one of distances D1, D2 being able to be determined in each case with each execution of the equation. Current values 211 are represented in this case in equation eq. 2 shown by variable x, while reference value clusters 213, 214 or the centers of the clusters are represented by variable $c_j$, j taking into consideration the number of different clusters and thus also the number of the different driving states.

For each current navigation period in which a navigation of the vehicle is carried out based on GNSS signals 203, values 211 of quality parameters, 206, 207, 208 of received GNSS signals 203 are associated with reference value cluster 213, 214, $c_j$, from which particular distance D1, D2 from particular reference value cluster 213, 214, $c_j$ is minimal. In the specific embodiment shown in FIG. 2, values 211 of quality parameters 206, 207, 208 of received GNSS signals 203 could thus be associated with reference value cluster 213 due to shorter distance D1.

In accordance with the association of values 211 of quality parameters 206, 207, 208 of received GNSS signals 203 with a reference value cluster 213, 214, driving state 209, 210, which is represented by the particular reference value cluster, is identified as current driving state 209, 210 of vehicle 201.

The dimension of parameter space 215 is defined via the number of quality parameters 206, 207, 208 taken into consideration in the analysis. In the specific embodiment shown, parameter space 215 is three-dimensional, since only three different quality parameters 206, 207, 208, for example, the signal strength, the signal-to-noise ratio, and the signal frequency, are taken into consideration. However, this is solely by way of example. In the actual embodiment, a large number of quality parameters 206, 207, 208 may be taken into consideration, which results in an N-dimensional parameter space 215.

Figure 4:
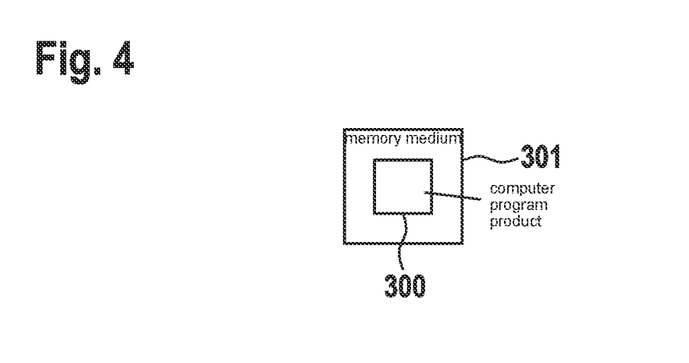
FIG. 4 shows a schematic representation of a computer program product.

FIG. 4 shows a schematic representation of a computer program product 300, including commands which, upon the execution of the program by a processing unit, prompt it to carry out method 100 for control assistance of a vehicle 201.

Computer program product 300 is stored on a memory medium 301 in the specific embodiment shown. Memory medium 301 may be any arbitrary memory medium from the related art for this purpose.

What is claimed is:

1. A method for control assistance of a vehicle, comprising:
   receiving global navigation satellite system (GNSS) signals from at least one navigation satellite;
   ascertaining quality parameters of the GNSS signals, the quality parameters describing a reception quality of the received GNSS signals;
   ascertaining a driving state of the vehicle based on the quality parameters of the GNSS signals by comparing values of the quality parameters of the received GNSS signals to previously known reference value clusters, each of the previously known reference value clusters including a respective plurality of reference values for the quality parameters of the GNSS signals, each previously known reference value cluster representing a respective previously known driving state, and each respective previously known driving state describing a state of the vehicle influencing a signal transmission of the GNSS signals;
   displaying the ascertained driving state of the vehicle to a driver of the vehicle, or providing the ascertained driving state of the vehicle to a vehicle controller of the vehicle;
   determining a signal integrity of the received GNSS signals based on the ascertained driving state and providing the determined signal integrity to a navigation module of a vehicle controller, and prompting a correction of a position determination by the navigation module based on the received GNSS signals and the determined signal integrity; and
   providing a control assistance function based on the ascertained driving state;
   wherein the reference values of the previously known reference value clusters are based on quality parameters of reference GNSS signals received during reference measurements, and the reference measurements were carried out for various vehicle driving states.

2. The method as recited in claim 1, wherein the ascertaining of the driving state includes:
   ascertaining a distance of the values of the quality parameters of the received GNSS signals to the respective reference values of the previously known reference value clusters in an at least one-dimensional parameter space spanned by the plurality of quality parameters according to a distance measure; and
   identifying the driving state represented by the previously known reference value cluster having the smallest distance to the values of the quality parameters of the received GNSS signals as the driving state of the vehicle.

3. The method as recited in claim 2, wherein the distance measure is a Euclidean distance.

4. The method as recited in claim 1, wherein each previously known reference value cluster is based on a plurality of quality parameters of a plurality of GNSS signals of various navigation satellites.

5. The method as recited in claim 4, wherein each respective reference value of each previously known reference value cluster is provided by a weighted mean value of quality parameters of the plurality of GNSS signals of the plurality of navigation satellites.

6. The method as recited in claim 1, wherein an association of each previously known reference value cluster with the respective driving state is effectuated by a trained artificial intelligence.

7. The method as recited in claim 1, wherein the association of the previously known reference value clusters with the respective driving states of the vehicle is effectuated by executing at least one k-means algorithm, the at least one k-means algorithm being configured to combine the plurality of reference values into previously known reference value clusters and to associate at least one previously known reference value cluster with each previously known driving state, so that the respective driving state is represented by the respective previously known reference value cluster.

8. The method as recited in claim 6, wherein the association of the previously known reference value clusters is effectuated by executing a plurality of k-means algorithms, each k-means algorithm being executed as a 1-means algorithm and being configured, for precisely one of the plurality of previously known driving states, to combine the respective reference values to form a previously known reference value cluster and assign it to the respective predetermined driving state, and for each predetermined driving state, for which reference values were determined by corresponding reference measurements, a separate 1-means algorithm is executed.

9. The method as recited in claim 1, wherein each respective previously known driving state includes at least one state from the following list:
   a GNSS antenna of the vehicle is damaged; or
   the GNSS antenna is coated by ice or snow or dust or dirt or moisture; or
   the GNSS antenna is at least partially concealed by a luggage roof rack or roof luggage or a roof structure of the vehicle; or
   the vehicle is located before or after a tunnel, or under a bridge, or under a tollbooth display; or
   the vehicle is located adjacent to a truck or adjacent to a soundproof barrier or adjacent to a building façade or the vehicle is surrounded by trees; or
   the vehicle is located in city traffic or intercity traffic.

10. The method as recited in claim 1, wherein the quality parameters of the GNSS signals include at least one parameter from the following list:
    signal strength, signal-to-noise ratio, signal quality, signal frequency, number of the received satellites, signal phase.

11. A processing apparatus for providing a control assistance function of a vehicle, comprising:
a non-transitory computer-readable storage medium, on which is stored a computer program, which is executable by a processor, including a program code arrangement having program code for providing control assistance of a vehicle, by performing the following:
receiving global navigation satellite system (GNSS) signals from at least one navigation satellite;
ascertaining quality parameters of the GNSS signals, the quality parameters describing a reception quality of the received GNSS signals;
ascertaining a driving state of the vehicle based on the quality parameters of the GNSS signals by comparing values of the quality parameters of the received GNSS signals to previously known reference value clusters, each of the previously known reference value clusters including a respective plurality of reference values for the quality parameters of the GNSS signals, each previously known reference value cluster representing a respective previously known driving state, and each respective previously known driving state describing a state of the vehicle influencing a signal transmission of the GNSS signals;
displaying the ascertained driving state of the vehicle to a driver of the vehicle, or providing the ascertained driving state of the vehicle to a vehicle controller of the vehicle;
determining a signal integrity of the received GNSS signals based on the ascertained driving state and providing the determined signal integrity to a navigation module of a vehicle controller, and prompting a correction of a position determination by the navigation module based on the received GNSS signals and the determined integrity signal; and
providing the control assistance function based on the ascertained driving state;
wherein the reference values of the previously known reference value clusters are based on quality parameters of reference GNSS signals received during reference measurements, and the reference measurements were carried out for various vehicle driving states.

12. A non-transitory computer-readable storage medium, on which is stored a computer program, which is executable by a processor, comprising:
a program code arrangement having program code for providing control assistance of a vehicle, by performing the following:
receiving global navigation satellite system (GNSS) signals from at least one navigation satellite;
ascertaining quality parameters of the GNSS signals, the quality parameters describing a reception quality of the received GNSS signals;
ascertaining a driving state of the vehicle based on the quality parameters of the GNSS signals by comparing values of the quality parameters of the received GNSS signals to previously known reference value clusters, each of the previously known reference value clusters including a respective plurality of reference values for the quality parameters of the GNSS signals, each previously known reference value cluster representing a respective previously known driving state, and each respective previously known driving state describing a state of the vehicle influencing a signal transmission of the GNSS signals;
displaying the ascertained driving state of the vehicle to a driver of the vehicle, or providing the ascertained driving state of the vehicle to a vehicle controller of the vehicle;
determining a signal integrity of the received GNSS signals based on the ascertained driving state and providing the determined signal integrity to a navigation module of a vehicle controller, and prompting a correction of a position determination by the navigation module based on the received GNSS signals and the determined integrity signal; and
providing a control assistance function based on the ascertained driving state;
wherein the reference values of the previously known reference value clusters are based on quality parameters of reference GNSS signals received during reference measurements, and the reference measurements were carried out for various vehicle driving states.

* * * * *